United States Patent [19]
Low et al.

[11] Patent Number: 4,904,837
[45] Date of Patent: Feb. 27, 1990

[54] POWERED MICROWAVE OVEN

[76] Inventors: Douglas W. Low, 15 Kingsway, Essex, Conn. 06426; Neil C. Titcomb, 38 Brookwood Dr., Branford, Conn. 06405

[21] Appl. No.: 259,124

[22] Filed: Oct. 18, 1988

[51] Int. Cl.[4] ............................................... H05B 6/66
[52] U.S. Cl. ...................... 219/10.55 B; 219/10.55 E; 219/10.55 D
[58] Field of Search .................. 219/10.55 B, 10.55 C, 219/10.55 D, 10.55 E, 10.55 R

[56] References Cited

U.S. PATENT DOCUMENTS

| | | |
|---|---|---|
| 4,471,422 | 9/1984 | Hierholzer, Jr. . |
| 4,488,057 | 12/1984 | Clarke . |
| 4,517,430 | 5/1985 | Slottag ........................ 219/10.55 B |
| 4,560,887 | 12/1985 | Schneider . |
| 4,667,075 | 5/1987 | Sakurai . |
| 4,719,326 | 1/1988 | Yoo ............................... 219/10.55 B |
| 4,742,442 | 5/1988 | Nilssen . |

OTHER PUBLICATIONS

Advertisement for Powamate Microwave Cooking System by Powamate Ltd.
Advertisement (mailorder) for SM-11 Battery Operated Microwave by Peter Schiff Enterprises.
Advertisement entitled "Innovations in Marine Products", by Peter Schiff Enterprises for SM-11 Battery Operated 12 VDC Microwave Oven.
Installation Instructions for SM-11 Battery Operated 12 VDC Microwave Oven by Peter Schiff Enterprises.
Block Diagram (FIG. 3) Wiring Diagram for the SM-11 Microwave Oven by Schiff.
Microwave Oven Service Manual for Model DMR-504.

*Primary Examiner*—Philip H. Leung
*Attorney, Agent, or Firm*—St. Onge Steward Johnston & Reens

[57] ABSTRACT

A microwave oven is described suitable for use on transports where DC power is available. The microwave oven employs a first inverter to generate internal AC power that is then used to operate the microwave components other than the magnetron microwave source. The internal AC power is passed with relatively low current through the oven interlocks to activate and drive a power inverter that, through an additional output transformer winding, delivers high voltage power to the magnetron. In a preferred embodiment a relay, that is connected to sense when external AC power is available, causes an automatic switching that decouples the internal AC power from the power inverter to enable conventional operation from external AC line power. When external AC line power is no longer applied, the microwave oven automatically switches to operate from the available DC power.

16 Claims, 4 Drawing Sheets

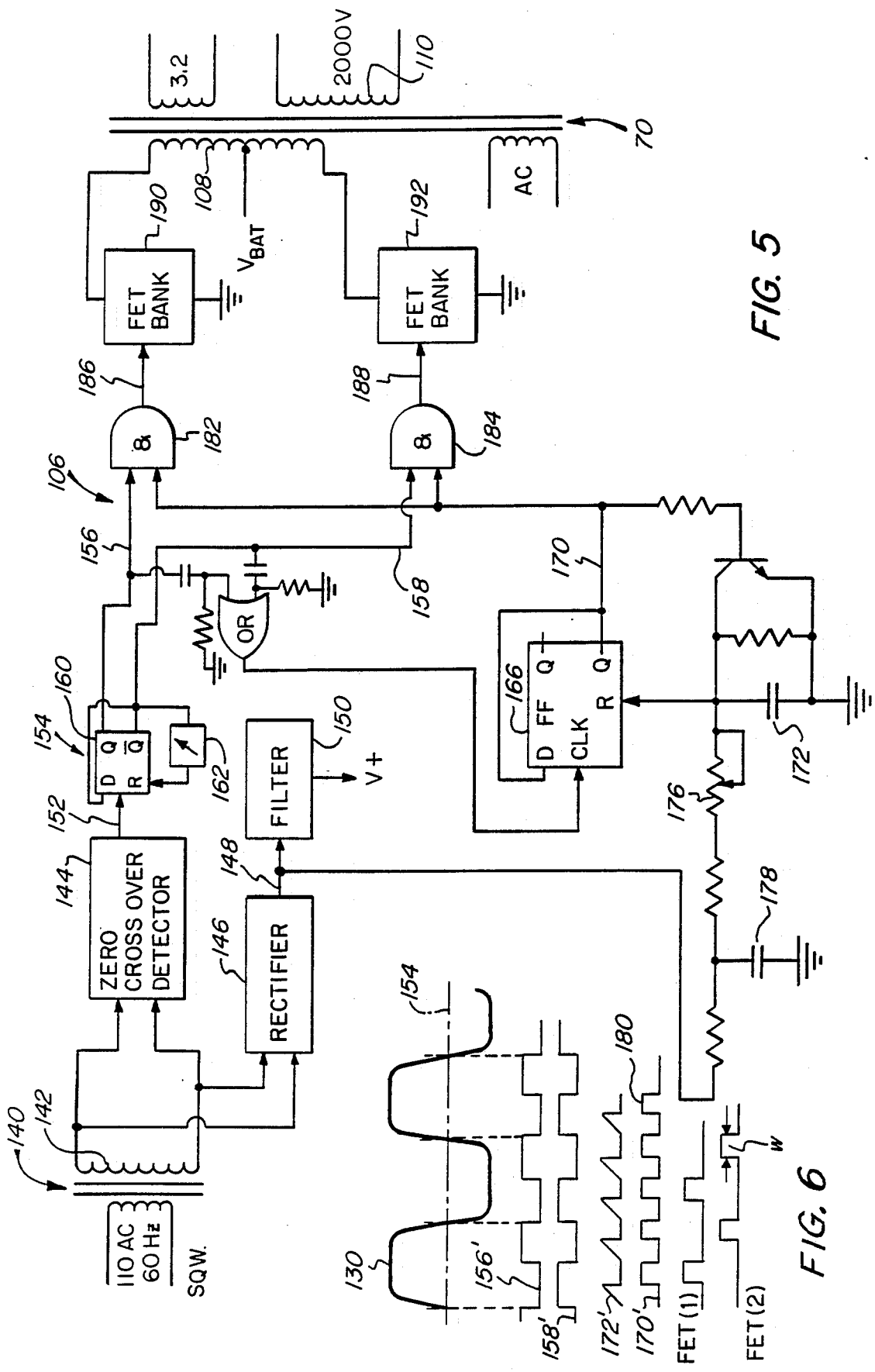

POWERED MICROWAVE OVEN

FIELD OF THE INVENTION

This invention generally relates to microwave ovens and more specifically to microwave ovens for use with transports, such as boats, vehicles, and the like.

BACKGROUND OF THE INVENTION

Use of microwave ovens with power available on recreational vehicles has been proposed. U.S. Pat. No. 4,667,075 to Sakurai, for example, proposes powering the oven by using three-phase, AC power generated by a vehicle mounted generator.

Microwave ovens employ magnetrons which require high power for short periods of time. Typically 1 kw. or more of electrical power is needed for cooking food during intervals that usually range from one to seven minutes depending upon what needs to be heated. Such power demands currents that can approach 100 or more amperes from a 12 volt DC battery when that is the source of power for the microwave oven.

It is imperative in the use of microwave ovens that microwave energy not be allowed to escape. Extensive leakage controls are applied. One such control involves interlocks that sense when the oven door is opened and thus prevent operation of the magnetron. It is not practical to operate such interlocks while low voltage high current electrical power for the magnetron is being passed through. At the typical DC input voltage of 12 volts used in cars, boats and other transports the electrical current is too high to safely pass through conventional microwave interlocks. The door operated switches would be likely to arc and present sufficient electrical resistance to overheat.

In view of the high power needs of a microwave oven, it is desirable to operate it from regular AC line voltage when that is available. This requires an ability to operate both from AC and DC power. In one known AC or DC powered microwave oven, the POWA-MATE, sold by E.C. Smith & Sons of Bedfordshire, England, an inverter is used to generate the full AC power needed to operate the oven from a 24 volt DC source. This AC power is then applied through the oven interlocks to operate the magnetron. The oven is built on top of the inverter, and as a result, is large, cumbersome and expensive, and difficult to install on a boat with limited storage capacity.

In another DC powered microwave oven sold by Peter Schiff Enterprises from Cookeville, Tenn., a conventional microwave oven is converted to DC battery operation. An inverter is used to generate power for the magnetron. DC power is supplied through a high current fuse to a center-tapped winding of an output transformer as well as through thermostat switches, a door interlock and a timer-controlled switch to a printed circuit (PC) board and to a DC-powered fan and light. A 60 Hz. signal is generated on the PC board to operate a timer motor.

This type of microwave oven cannot operate from AC power, and appears to employ the interlocks in a manner that is different from conventional AC powered microwave ovens.

SUMMARY OF THE INVENTION

In a preferred microwave oven in accordance with the invention, either AC or DC power can be used to power the oven while the conventional interlock safety system of the oven is employed without alteration and with a relatively small amount of additional volume needed for the power inverter.

This is obtained with one microwave oven in accordance with the invention by including both low power and high power inverters. The low power inverter produces internal AC power that can be at line voltage and is connected through normally-available oven interlocks to drive the high power inverter, which then in turn provides the power needed for the magnetron when the oven is turned on. This internal AC line power is also coupled to operate conventional microwave oven components, such as its lamp, fan motor, and a digital control circuit if that is part of the microwave oven.

An automatically-operated switch enables powering of the oven from either external AC power or DC battery power.

Since, even when the oven is operated from DC battery power, internal AC line power is generated, the microwave oven's conventional operating components can be used. This enables use of standard production microwave ovens with relatively few alterations.

One such alteration is the addition of a primary center-tapped winding on the output transformer through which the high power inverter can generate the high voltage for the magnetron. Another change is the insertion of a relay-operated switch by which external AC power is sensed and causes an automatic disconnection from DC power when external AC power is applied and an automatic connection effective to enable DC powering of the oven when external AC power is no longer applied. Such changes can be conveniently implemented while substantially retaining the envelope of the conventional microwave oven.

Although for most uses adaptation to external AC line power is desired, a microwave oven in accordance with the invention can be powered solely from a DC battery.

It is, therefore, an object of the invention to provide a microwave oven that can be safely operated from DC power available on transports such as boats or vehicles while utilizing conventional microwave interlocks without substantial modification of a conventional oven. It is a further object of the invention to provide a safe, economically-manufactured microwave oven that can be powered from DC or AC power and automatically switches to available AC power.

These and other objects and advantages of the invention can be understood from the following description of a preferred embodiment shown in the drawings.

BRIEF DESCRIPTION OF DRAWINGS

FIG. 5 is a schematic block diagram for a power inverter used in the microwave oven of FIG. 4; and FIG. 6 is a timing diagram of waveforms generated in the power inverter shown in FIG. 5.

DETAILED DESCRIPTION OF DRAWINGS

Figure 1:
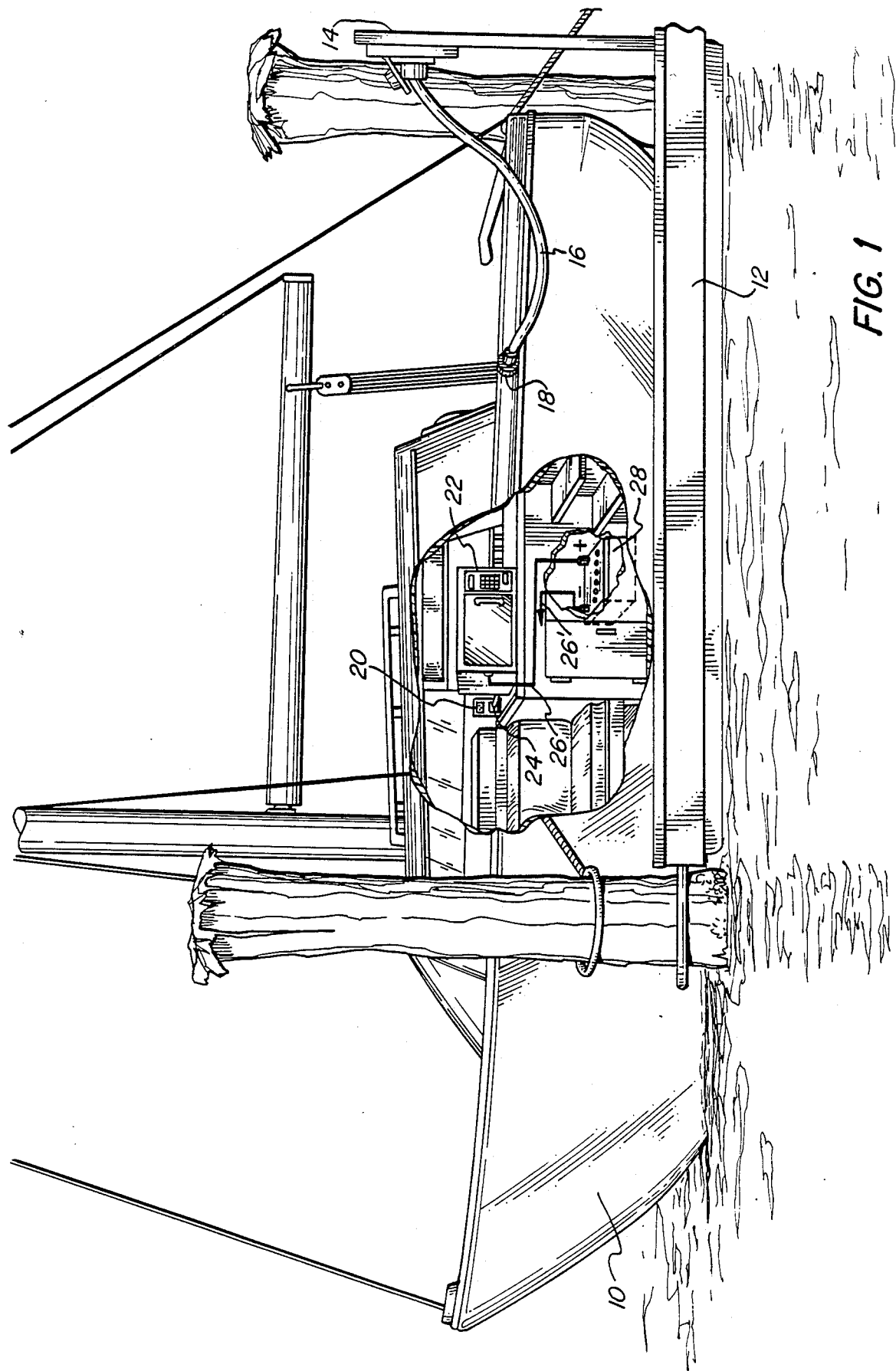
FIG. 1 is a side, partially cut-away, view of a sailboat type transport using a microwave oven in accordance with the invention.

With reference to FIG. 1, a transport such as a sailboat 10 is shown tied to a slip 12. It should be understood that the microwave oven can be used in different environments such as with vehicles, campers, or other locations where DC input power is available. Shore power is made available at a post 14 and connected by a cable 16 to a receptacle 18 to provide external AC line power at a conventional wall socket 20 inside the cabin near the galley. A microwave oven 22 in accordance with the invention is electrically connected to the external AC line power at socket 20 and by way of short cables 26, 26' to a DC battery 28.

Oven 22 is formed like a conventionally-known microwave oven, except for modifications in accordance with the invention. An important feature of microwave oven 22 is that it will automatically switch to shore power when that becomes available as shown in FIG. 1.

Figure 2:
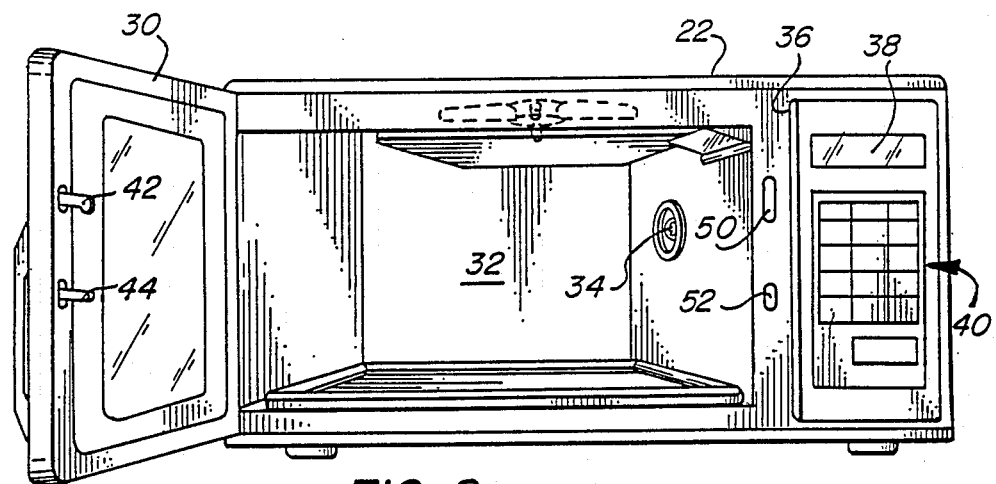
FIG. 2 is a front view in elevation of a microwave oven in accordance with the invention.
Figure 4:
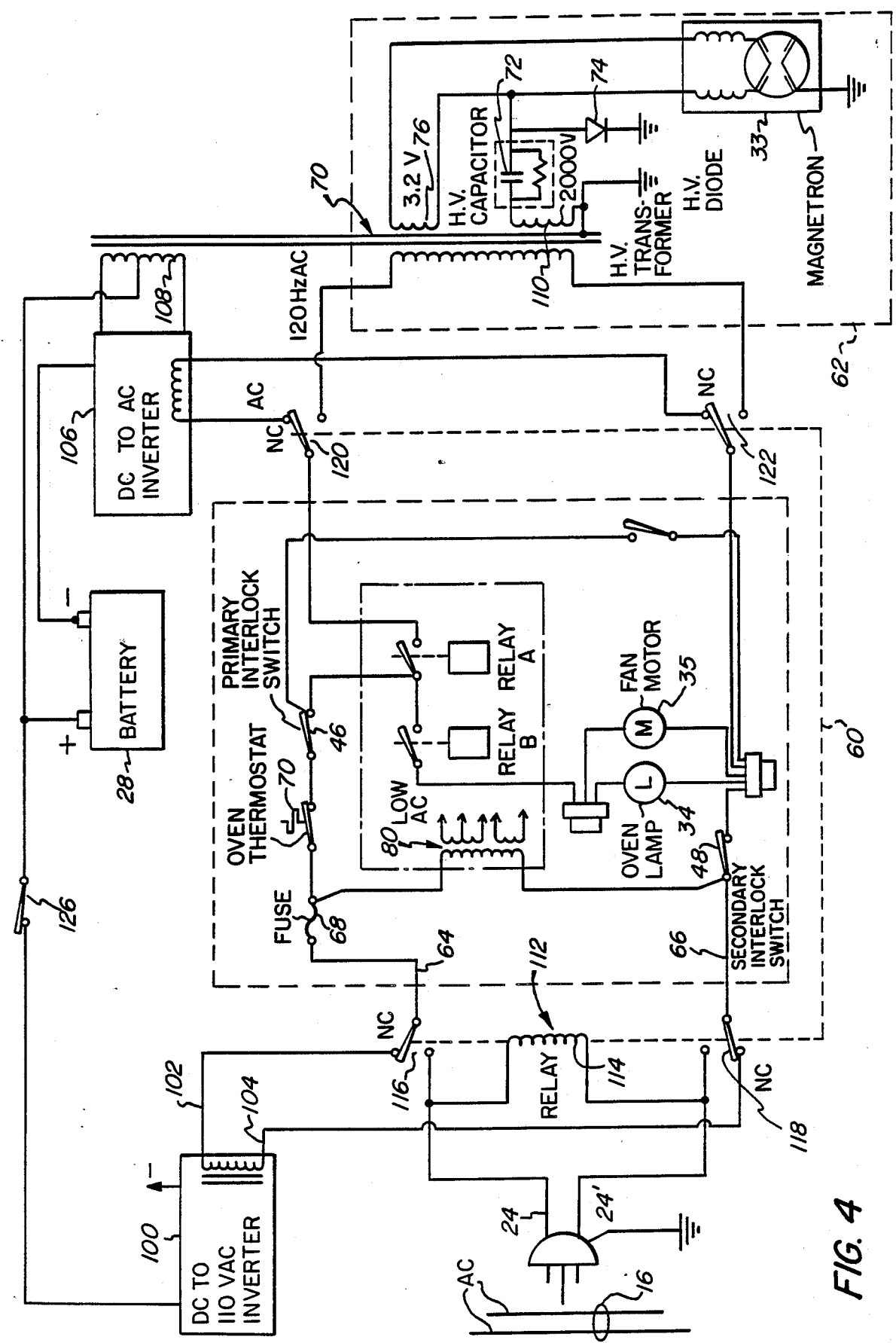
FIG. 4 is a schematic block diagram for the microwave oven of FIG. 2.

As illustrated in FIG. 2, microwave oven 22 has a door 30 to close a cooking cavity 32 that is exposed to microwave radiation from a magnetron 33 (see FIG. 4). A lamp 34 illuminates cavity 32 and a motor driven fan 35 (see FIG. 4), causes a circulation of air. A digital control 36 may be provided as illustrated with a display 38, control buttons 40 and a digital clock. The door 30 is provided with suitable levers 42, 44 that activate switches 46, 48 (see FIG. 4) inside recesses 50, 52. These switches 46, 48 serve as interlocks to interrupt magnetron power as soon as the door is cracked open, thus preventing leakage of microwave power from a partially-opened door. The microwave oven as shown in FIG. 2 is like the AC line powered model DMR-504 made by the Daewoo Company of Korea except for certain modifications as hereinafter described. Other conventional ovens may be used such as those that do not employ digital circuitry.

Figure 3:
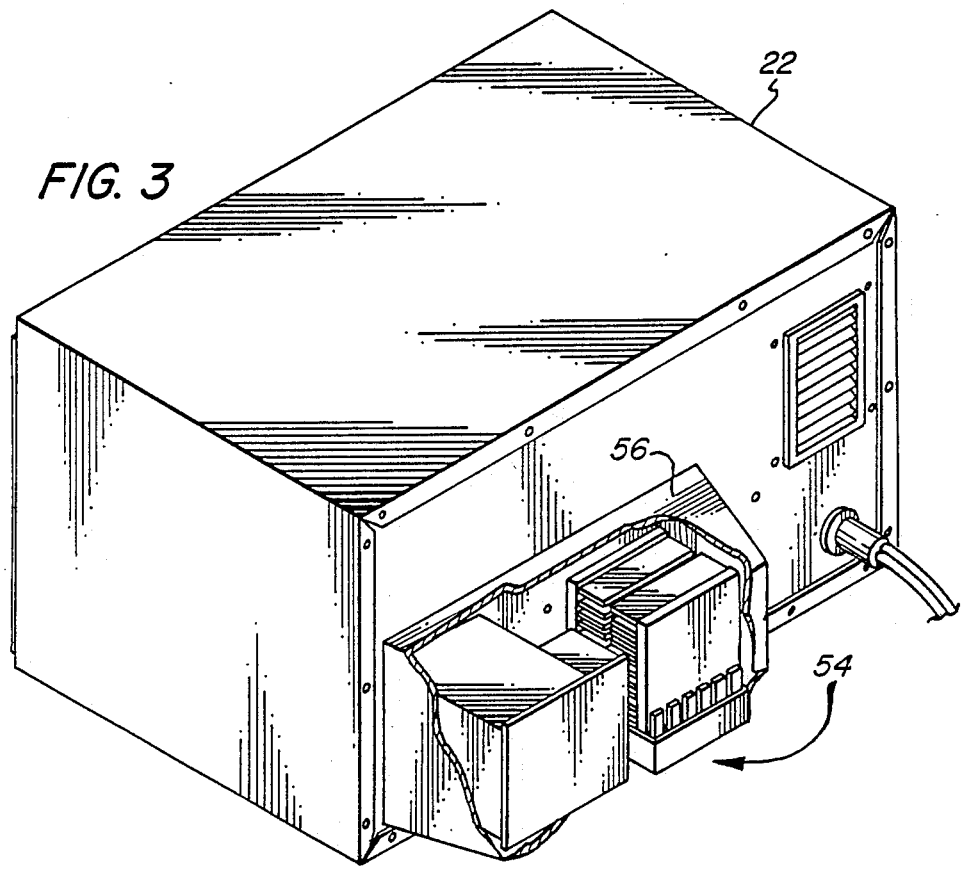
FIG. 3 is a rear perspective view of the microwave oven shown in FIG. 2.

FIG. 3 illustrates at 54 additional circuitry to enable the microwave oven to be powered from a DC source. The additional circuits occupy additional space provided inside an enclosure 56 that is attached to the rear of the microwave oven 22. As can be seen from FIG. 3, the envelope for the conventional microwave oven remains substantially unchanged by the addition of enclosure 56.

FIG. 4 shows an electrical circuit employed to operate microwave oven 22 from either DC power or external AC line power on line 16. The microwave oven has as standard equipment those network portions delineated by dashed lines 60 and 62. Thus, within network portion 60 AC line power is normally supplied along lines 64, 66 through a fuse 68, an oven thermostat 70, interlock switches 46, 48 to drive a magnetron 33 by way of a high voltage output transformer 70, high voltage capacitor 72 and diode 74. A low AC voltage filament heater winding 76 is normally included in output transformer 70. The external AC line power also provides suitable low AC voltage power with a transformer 80 to produce the DC voltage needed for the digital control circuit 36 used to control the microwave oven 22.

Operation of microwave oven 22 from a DC supply is obtained with the inclusion of a lower power DC to AC inverter 100 which produces across its transformer output lines 102, 104 an internal AC line power with the voltage and frequency needed to operate the circuitry inside network portion 60 as well as the drive for a large power DC to AC inverter 106. This inverter delivers AC power through an additional winding 108 of transformer 70 to generate the high voltage on output winding 110 for magnetron 33.

A relay 112 having its coil 114 connected across external AC lines 24, 24', controls multiple switches 116, 118, 120 and 122. These switches are so connected that in the absence of activating AC power on lines 24, 24', electrical power for operation of the microwave oven is obtained from battery 28. As soon as external AC line power is applied, however, relay 112 senses this and activates its coil 114 to cause switches 116–122 to connect external AC line power to the microwave components inside network 60 and to the output transformer 70 through interlock switches 46 and 48.

When only DC power is available, and circuit breaker 126 is closed, inverter 100 generates relatively low internal AC line power that is sufficient to activate the DC control 36 (see FIG. 2), the oven lamp 34, fan motor 35 and the drive for power inverter 106. The latter inverter is so designed that it requires the presence of the internal AC power to produce an AC power signal through primary transformer winding 08. Hence, if an interlock switch, 46 or 48, is opened, power from inverter 106 is immediately extinguished.

The internal AC power inverter 100 can be made of well-known, low-cost components and need not produce a large amount of AC power, usually less than about 60 watts. Generally about 35 watts will be sufficient. The internally-generated AC power has, for the U.S. market, an AC line voltage of about 110 volts at a frequency of 60 Hz. and may be in the form approaching a square wave rather than a sine wave as shown with curve 130 in FIG. 6. For foreign markets, a voltage of about 220 volts at 50 Hz. is generated to correspond with local line power standards. The internal AC line power is, as shown in FIG. 5, passed through a 10 to 1 reduction transformer 140 whose secondary winding 142 is coupled to a zero cross-over detector 144 and a rectifier 146. The output 148 of rectifier 146 is applied through a filter 150 to provide a DC voltage source for the several logic circuits used in inverter 106.

The zero cross-over detector produces on its output 152, a pulse each time that the AC signal across winding 142 crosses a zero reference level 154.

This pulse is then applied to a frequency doubler network 154 whose opposite outputs 156, 185 provide pulses as shown respectively by curves 156' and 158'. Frequency doubler network 154 may be formed of a D flip flop 160 that has an output 158 coupled through an adjustable timing circuit 162 to its reset input R. The timing circuit is adjusted to about one fourth of the 60 Hz. period of the internal AC line power. This doubles the input signal frequency as shown with curves 156', 158'.

The positive transitions of both outputs 156 and 158 from the frequency doubler are then used to clock a flip flop 166 by way of a differentiating network 168. When the Q output 170 of flip flop 166 goes to an active state, a capacitor 172 is allowed to charge as shown by curve 172' in FIG. 6. The rate at which capacitor 172 charges is controlled by the adjustment of a potentiometer 176 and the voltage across a capacitor 178 that is coupled to the output 148 of rectifier 146. Since the voltage across capacitor 178 is a function of the voltage of the battery 28, a regulation of the output power as a function of input voltage DC is obtained.

Thus, a higher battery voltage results in a faster charge of capacitor 172 and thus an earlier reset of flip flop 166. The potentiometer 176 is adjusted so that the time required to charge capacitor 172 to the reset value corresponds to the duty cycle needed to deliver rated power to the magnetron 33 (see FIG. 4). The output 170 of flip flop 166 thus follows a curve as shown at 170' in FIG. 6 with the width, w, of pulses 180 being modulated to determine the amount of power to the magnetron 33.

The output 170 of flip flop 166 is applied to inputs of two and gates 182, 184 which have other inputs respectively connected to doubler network output lines 156, 158. The outputs 186 and 188 of the AND gates provide gating signals to banks 190, 192 of parallel connected FET switches. Banks 190, 192 are respectively connected between the ends of output transformer winding 108 and the battery return terminal. Each bank of FET switches is provided with a suitable protection circuit as is well known in the art.

During operation, the banks 190, 192 of FETs are alternately turned on and off. This alternately pulls either side of the transformer primary winding to ground. Each FET bank 190 and 192 includes a voltage snubbing circuit that turns on the "off" FET bank when the flyback of a released transformer primary leg exceeds the voltage rating of a snubbing zener diode. This prevents the drain-to-gate voltage rating of the various FETs from being exceeded.

With an inverter circuit 106, a minimum input signal is needed to deliver electrical power to the magnetron 33. A minimum square wave input voltage at the primary winding of input transformer 140 is required before the circuit can operate, for example, at least 90 volts rms. An input signal frequency of greater than 50 Hz. is required lest the high voltage transformer 70 is driven into saturation and blows the fuse or circuit breaker.

Hence, with a microwave oven in accordance with the invention, the internally-generated AC power signal must be present at the power inverter 106 for it to supply power to the magnetron. If the internal input signal is interrupted, such as by opening of the oven door, power flow to the magnetron immediately stops. This protective feature is obtained by retaining established interlocks and safety features built into existing standard microwave ovens and without requiring that a full power high DC current for the magnetron be passed through the interlocks.

Having thus described a preferred embodiment for a microwave oven in accordance with the invention, the advantages of the invention can be appreciated. Variations from the described embodiment can be made since this is presented to illustrate the invention. For example, it is possible to build a microwave oven in accordance with the invention without the ability to use external AC power. In such case, the relay 112 with its switches 116–122 can be dispensed with. Other types of power inverters can be used, provided, however, that they require an input power signal to deliver electrical power to the magnetron.

What is claimed is:

1. A microwave oven capable of operating from DC input power available on transports, comprising:
    a microwave oven housing enclosing a heating chamber and having, a door for access to the chamber, a source of microwave energy, interlock safety means for preventing external radiation of microwave energy when the door is opened and enabling energizing of the microwave source when the door is closed;
    first inverter means for generating internal AC power from DC input power;
    means coupled through the interlock safety means to the internal AC power for generating a high voltage power for energizing the microwave source, said high voltage power generating means including power inverter means for generating, in response to activation from said internal AC power, said high voltage from said DC input power;
    whereby said source is energized with high voltage from said DC input power as long as said internal AC power passes through said interlock safety means so as to preserve the safety provided thereby.

2. The microwave oven as claimed in claim 1 wherein said microwave oven has operating components including a fan, a lamp, and a digital control and wherein said first inverter means generates said internal AC power with sufficient power to energize said operating components of the microwave oven and drive said power inverter means.

3. The microwave oven as claimed in claim 1 wherein said first inverter means produces generally less than about 60 watts of said internal AC power at AC line voltage.

4. The microwave oven as claimed in claim 1 wherein the high voltage generating means includes an output transformer having an output winding across which a high AC voltage is produced, and an input winding coupled to the power inverter means and a terminal of the DC input power to provide a high AC voltage across the output winding in response to operation of the power inverter means.

5. The microwave oven as claimed in claim 4 wherein the power inverter means includes:
    first and second power switch means coupled between ends of said input winding of the output transformer and a return terminal of said DC input power; and
    means responsive to the internal AC power signal for deriving trigger signals therefrom to alternately open and close said first and second power switch means.

6. The microwave oven as claimed in claim 5 and further including:
    means responsive to the internal AC power signal for producing a reference signal representative of the voltage level of the DC input power; and
    means responsive to said reference signal for modulating said trigger signals to maintain a desired high voltage power to the microwave source when the voltage level of the DC input power changes.

7. The microwave oven as claimed in clam 6 wherein said first inverter means produces internal AC line power at AC line frequency that is compatible with the powering of conventional microwave components.

8. The microwave oven as claimed in claim 7 wherein said means for producing said trigger signals includes:
    means for generating said trigger signals at twice the line frequency of the internal AC power.

9. A microwave oven capable of operating from external AC line power and from DC input power available on transport, comprising:
    a microwave oven housing enclosing a heating chamber and having, a door for access to the chamber, a source of microwave energy, interlock safety means for preventing external radiation of microwave energy when the door is opened and enabling energizing of the microwave source when the door is closed;

first inverter means for generating internal AC power from DC input power;

means for generating a high voltage for energizing the microwave source, said latter means including second inverter means for generating, in response to said internal AC power, said high voltage from said DC input power and AC means for generating said high voltage from external AC line power; and switch means for selectively coupling one of said internal AC power and said external AC line power, through the interlock means, to the second inverter means for drive thereof or the AC means;

whereby said source is energized with high voltage from either said external AC line power or said DC input power while preserving safety provided by said interlock safety means.

10. The microwave oven as claimed in claim 9 wherein said microwave oven has operating components including a fan, a lamp, and a control and wherein said first inverter means generates said internal AC power with sufficient power to energize said operating components of the microwave oven and drive said second inverter means.

11. The microwave oven as claimed in claim 10 wherein said switch means is responsive to the presence of said external AC line power to automatically couple it to the AC means while decoupling said internal AC power from the second inverter means.

12. The microwave oven as claimed in claim 9 wherein said first inverter means produces generally less than about 60 watts of said internal AC power at AC line voltage.

13. The microwave oven as claimed in claim 9 wherein the high voltage generating means includes an output transformer having a first input winding coupled to the switch means, an output winding across which a high AC voltage is produced, and a second input winding coupled to the second inverter means and a terminal of the DC input power to provide said high AC voltage across the output winding in response to operation of the second inverter means.

14. The microwave oven as claimed in claim 13 wherein the interlock means has an input side and an output side, and wherein the switch means includes:

a first switch connecting the output side of the interlock means with either said second inverter means or said AC means; and a second switch connecting either said internal AC power from the first inverter means or said external AC line power to the input side of the interlock means.

15. The microwave oven as claimed in claim 14 wherein the switch means further includes:

a relay having a relay coil and operatively coupled to the first and second switches for control thereof, said relay coil being coupled to respond to said external AC line power and operate the first and second switches from a normal position, in which said internal AC power is coupled to activate the high voltage generating means, to a position in which said external AC line power is coupled to drive the high voltage generating means.

16. The microwave oven as claimed in claim 13 wherein the second inverter means includes:

first and second power switch means coupled between ends of said second input winding of the output transformer and a return terminal of said DC input power; and means responsive to the internal AC power for deriving trigger signals therefrom to alternately open and close said first and second power switch means.

* * * * *